(12) United States Patent  (10) Patent No.: US 9,118,545 B2
Suerbaum  (45) Date of Patent: Aug. 25, 2015

(54) COMMUNICATING A NETWORK EVENT (75) Inventor: Clemens Suerbaum, München (DE)

(73) Assignee: Nokia Solutions and Networks Oy, Espoo (FI)

( * ) Notice: Subject to any disclaimer, the term of this patent is extended or adjusted under 35 U.S.C. 154(b) by 24 days.

(21) Appl. No.: 13/145,671

(22) PCT Filed: Feb. 2, 2009

(86) PCT No.: PCT/EP2009/051146
§ 371 (c)(1),
(2), (4) Date: Jul. 21, 2011

(87) PCT Pub. No.: WO2010/086028
PCT Pub. Date: Aug. 5, 2010

(65) Prior Publication Data
US 2011/0280157 A1  Nov. 17, 2011

(51) Int. Cl.
*H04L 12/24* (2006.01)
(52) U.S. Cl.
CPC ......... *H04L 41/0663* (2013.01); *H04L 41/0233* (2013.01); *H04L 41/046* (2013.01)
(58) Field of Classification Search
USPC ........................... 370/254–255; 709/220–223
See application file for complete search history.

(56) References Cited

U.S. PATENT DOCUMENTS

| | | | |
|---|---|---|---|
| 7,453,890 B2 * | 11/2008 | Quilty et al. ................. | 370/401 |
| 7,523,184 B2 * | 4/2009 | Kortright ..................... | 709/223 |
| 7,783,800 B2 * | 8/2010 | Staats et al. ................. | 710/64 |
| 7,835,305 B2 * | 11/2010 | Onishi ......................... | 370/254 |
| 7,856,486 B2 * | 12/2010 | Robertson et al. ........... | 709/220 |
| 7,949,744 B2 * | 5/2011 | Kortright ..................... | 709/223 |
| 8,107,950 B2 * | 1/2012 | Amirijoo et al. ............. | 455/423 |
| 8,255,496 B2 * | 8/2012 | Shukla et al. ................ | 709/220 |
| 2003/0069960 A1 * | 4/2003 | Symons et al. .............. | 709/224 |
| 2006/0092861 A1 * | 5/2006 | Corday et al. ............... | 370/256 |
| 2007/0022470 A1 * | 1/2007 | Yang ............................. | 726/3 |
| 2007/0276936 A1 * | 11/2007 | Hirsch ......................... | 709/223 |
| 2008/0043640 A1 * | 2/2008 | Smith et al. ................. | 370/255 |
| 2008/0268833 A1 * | 10/2008 | Huang et al. ................ | 455/425 |
| 2008/0313491 A1 * | 12/2008 | Adams et al. ............... | 714/4 |

(Continued)

FOREIGN PATENT DOCUMENTS

EP    1 655 974 A1   5/2006
WO   WO 2004/004384 A1   1/2004

OTHER PUBLICATIONS

3GPP TS 32.302 V8.0.0 (Dec. 2008), "$3^{rd}$ Generation Partnership project; Technical Specification Group Services and System Aspects; Telecommunication management; Configuration Management (CM); Notification Integration Reference Point (IRP): Information Service (IS) (Release 8)", 27 pgs.

(Continued)

*Primary Examiner* — Jackie Zuniga Abad
*Assistant Examiner* — Lakeram Jangbahadur
(74) *Attorney, Agent, or Firm* — Harrington & Smith (57) ABSTRACT

An Agent Apparatus is described including a Detecting Device for detecting the execution of an automated function within a communication network. The Agent Apparatus further includes a Type Determining Device for determining the type of the automated function and a Writing Device for writing information representing the type of the automated function in a predefined storage area of a record carrier.

10 Claims, 4 Drawing Sheets

(56) References Cited

U.S. PATENT DOCUMENTS

| | | | | |
|---|---|---|---|---|
| 2009/0037899 | A1* | 2/2009 | Dharap et al. | 717/173 |
| 2009/0113033 | A1* | 4/2009 | Long et al. | 709/223 |
| 2010/0094981 | A1* | 4/2010 | Cordray et al. | 709/222 |
| 2010/0235433 | A1* | 9/2010 | Ansari et al. | 709/203 |
| 2010/0268802 | A1* | 10/2010 | Lipps et al. | 709/220 |
| 2012/0064897 | A1* | 3/2012 | Amirijoo et al. | 455/436 |

OTHER PUBLICATIONS

3GPP TS 32.501 V0.1.2 (Jun. 2008), "3$^{rd}$ Generation Partnership Project; Technical Specification Group Services and System Aspects; Telecommunication management; Self Establishment of eNodeBs (SEe); Concepts and Requirements (Release 8)", 16 pgs.

3GPP TS 32.502 V8.0.0 (Dec. 2008), "3$^{rd}$ Generation Partnership Project; Technical Specification Group Services and System Aspects; Telecommunication management; Self-Configuration of Network Elements Integration Reference Point (IRP); Information Service (IS) (Release 8)", 33 pgs.

3GPP TS 32.503 V8.0.0 (Dec. 2008), "3$^{rd}$ Generation Partnership Project; Technical Specification Group Services and System Aspects; Telecommunication management; Self-Configuration of Network Elements Integration Reference Point (IRP); Common Object Request Broker Architecture (CORBA) Solution Set (SS) (Release 8)", 16 pgs.

3GPP TS 32.532 V8.0.0 (Dec. 2008), "3$^{rd}$ Generation Partnership Project; Technical Specification Group Services and System Aspects; Telecommunication management; Software management Integration Reference Point (IRP); Information Service (IS) (Release 8)", 33 pgs.

3GPP TS 32.533 V8.0.0 (Dec. 2008), "3$^{rd}$ Generation Partnership Project; Technical Specification Group Services and System Aspects; Telecommunication management; Software management Integration Reference Point (IRP); Common Object Request Broker Architecture (CORBA) Solution Set (SS) (Release 8)", 23 pgs.

3GPP TS 32.662 V8.0.0 (Dec. 2008), "3$^{rd}$ Generation Partnership Project; Technical Specification Group Services and System Aspects; Telecommunication management; Configuration Management (CM); Kernal CM Information Service (IS) (Release 8)", 22 pgs.

3GPP TS 32.663 V8.0.0 (Dec. 2008), "3$^{rd}$ Generation Partnership Project; Technical specification Group Services and System Aspects; Telecommunication management (CM); Kernal CM Integration Reference Point (IRP); Common Object Request Broker Architecture (CORBA) Solution Set (SS) (Release 8)", 20 pgs.

3GPP TS 32.665 V8.0.0 (Dec. 2008), "3$^{rd}$ Generation Partnership Project; Technical Specification Group Services and System Aspects; Telecommunication management; Configuration Management (CM); Kernal CM Integration Reference Point (IRP); Extensible Markup Language (XML) definitions (Release 8)", 12 pgs.

Rott, A., "Self-Healing in Distributed Network Environments", © 2007 IEEE, 6 pgs.

3GPP TS 32.667 v7.1.0 (Dec. 2008); 3rd Generation Partnership Project; Technical Specification Group Services and System Aspects; Telecommunication management; Configuration Management (CM); Kernel CM Integration Reference Point (IRP): SOAP solution set (Release 7).

* cited by examiner

FIG 7

COMMUNICATING A NETWORK EVENT

TECHNICAL FIELD OF THE INVENTION

The present invention relates to the technical field of telecommunication networks and to handling of events in a communication network. In particular the present invention relates to a method for detecting employing an automated function, to an Agent Apparatus, to a method for detecting in a Management Apparatus employing an automated function, to a Management Apparatus, to a computer-readable medium for controlling at least one of the methods, to a data structure, to a record carrier and to a use of an object according to the 3GPP standard TS 32.662 for storing a type of an employed automated function.

BACKGROUND OF THE INVENTION

Automated network functions may allow implementing tasks of a network management system into a communication network. Automated functions may allow self-organization functionality of the network such as self-configuration, self-optimization, self-healing and/or automated software management. The plurality of automated functionalities implemented in a network may be called "self-X" functionalities. The self-X functionalities may allow reducing the OPEX (Operational Expenditure) for operating and maintaining a network (OAM, Operation Administration Maintenance), in particular for a telecommunication network or a cellular network. Network elements supporting self-X functionalities may perform tasks which usually are performed by management applications or human OAM operators.

Self-X functionalities however may also reduce the transparency of a network for a network operator. The operator may not get information about activities happening inside the network, since the network may be organized using the self-X functionalities or may be managed by self-X functionalities. Thus, the operator may be kept in the "dark" about what may actually happen inside the network or about what happened while a self-X functionality may have been employed or executed. The network operator may only receive indications that data in a network may have been changed. In an example the network operator may receive an indication that data, which may be mirrored in a database, such as a MIB (Management Information Base) of a Network Management Centre (NMC), may be created, changed or deleted. Generating or mirroring the data may only provide raw data without transmitting any content or impact of the executed functions. Thus, an operator or Network Management System (NMS), which should know the status of the network may be more or less only informed about the fact that something may have happened within the network but not what happened.

The document 3GPP (3rd Generation Partnership Project) TS 32.302, "3rd Generation Partnership Project, Technical Specification Group Services and System Aspects, Telecommunication Management, Configuration Management (CM), Notification Integration Reference Point (IRP), Information Service (IS)", Release 8, V8.0.0, 2008-12, may define an interface through which an IRPManager can subscribe to an IRPAgent for receiving notification.

The document 3GPP TS 32.662, "3rd Generation Partnership Project, Technical Specification Group Services and System Aspects, Telecommunication Management, Configuration Management (CM), Kernel CM Information Service (IS)", Release 8, V8.0.0, 2008-16 may define Integration Reference Point (IRP) through which an "IRPAgent", for example an Element Manager (EM) or a Network Element (NE) can communicate configuration management related information to one or several "IRPManagers", for example network managers.

The document 3GPP TS 32.663, "3rd Generation Partnership Project, Technical Specification Group Services and System Aspects, Telecommunication Management, Configuration Management (CM), Kernel CM Integration Reference Point (IRP)", Common Object Request Broker Architecture (CORBA), Solution Set (SS)", Release 8, V8.0.0, 2008-12, may define the mapping of the Kernel CM IRP:IS to protocol specific details necessary for implementing this IRP in a CORBA/IDL (Interface Definition Language) environment.

The document 3GPP TS 32.665, "3rd Generation Partnership Project, Technical Specification Group Services and System Aspects, Telecommunication Management, Configuration Management (CM), Kernel CM Integration Reference Point (IRP), eXtensible Markup Language (XML) definitions", Release 8, V8.0.0, 2008-12 may specify the XML definitions for the Kernel CM Integration Reference Point (IRP) as it may apply to the interface Itf-N.

The document 3GPP TS 32.502, "3rd Generation Partnership Project, Technical Specification Group Services and System Aspects, Telecommunication Management, Self-Configuration of Network Element Integration Reference Point (IRP), Information Service (IS)", Release 8, V8.0.0, 2008-12 may define Information Service (IS) part of a Self-Configuration IRP (SCIRP).

In the document 3GPP TS 32.503, "3rd Generation Partnership Project, Technical Specification Group Services and System Aspects, Telecommunication Management, Self-Configuration of Network Element Integration Reference Point (IRP), Common Object Request Broker Architecture (CORBA) Solution Set (SS)", Release 8, V8.0.0, 2008-12 a CORBA solution set of software management IRP may be described for an IRP whose semantics may be specified in software management IRP information service.

The document 3GPP TS 32.532, "3rd Generation Partnership Project, Technical Specification Group Services and System Aspects, Telecommunication Management, Software Management Integration Reference Point (IRP), Information Service (IS)", Release 8, V8.0.0, 2008-12, may describe a software management interface IRP information service.

The document 3GPP TS 32.533, "3rd Generation Partnership Project, Technical Specification Group Services and System Aspects, Telecommunication Management, Software Management Integration Reference Point (IRP), Common Object Request Broker Architecture (CORBA) Solution Set (SS)", Release 8, V8.0.0, 2008-12, may describe a CORBA solution set of software management IRP for an IRP whose semantics may be specified in software management IRP information service.

There may be a need to provide a more efficient network management.

SUMMARY OF THE INVENTION

According to an exemplary embodiment of the present invention, a method for detecting employing of an automated function, an Agent Apparatus, a method for detecting in a Management Apparatus employing of an automated function within a communication network, a Management Apparatus, a computer-readable medium, a program element, a data structure, a record carrier, and a use of an object according to the 3GPP standard TS 32.662 for storing a type of an automated function may be provided.

According to an exemplary embodiment of the present invention, a method for detecting employing an automated function may be provided. In an example the method may comprise detecting the execution of an automated function within a communication network, determining the type of the automated function and writing information representing the type of the automated function in a predefined storage area of a record carrier or data structure. In an example the end of the execution of an automated function may be detected.

According to another exemplary embodiment of the present invention, an Agent Apparatus, comprising a Detecting Device, a Type Determining Device and a Writing Device may be provided. The Detecting Device may be adapted for detecting the execution of an automated function within a communication network. In an example the Type Determining Device may be adapted for determining the type of an executed automated function and the Writing Device may be adapted for writing information representing the type of the automated function in a predefined storage area of a record carrier.

In an example, writing information representing the type of the automated function may comprise creating an object, deleting an object and/or changing an object. An object in an example may be a managed object. In a further example writing a type of an automated function may comprise using a notifyObjectCreation method, using a notifyObjectDeletion method and/or using a notifyAttributeValueChange method.

The concept of creating, deleting and/or changing Managed Objects may allow communicating between an Agent Apparatus and a Management Apparatus. In other words, the Agent Apparatus may write, delete and/or change values at predefined storage areas of a record carrier. Thus, a Management Apparatus may access these predefined storage areas in order to read-out corresponding values. In order to inform the Management Apparatus about creation, deletion and/or change of the managed objects an Agent Apparatus may use a corresponding method and/or message, e.g. a notifyObjectCreation method, a notifyObjectDeletion method and/or a notifyAttributeValueChange method.

Creating a Managed Object may comprise structuring an unstructured record carrier with an address scheme, e.g. by an object definition. Having an agreed object model between the Agent Apparatus and the Management Apparatus may allow communicating the Agent Apparatus with the Management Apparatus by accessing corresponding parameter. Thus, in an example the addressing structure or the address scheme for the record carrier may substantially only exist during the existence of a Managed Object.

According to yet another exemplary embodiment of the present invention, a method for detecting in a Management Apparatus employing an automated function within a communication network may be provided. The detecting method may comprise reading-out information representing the type of the automated function of a predefined storage area of a record carrier and determining the employment of an automated function using the read-out information.

In an example, the method for detecting employing an automated function or detecting the employment of an automated function may comprise detecting the execution of an automated function, e.g. by receiving a corresponding message. The message or a method corresponding to the message may be a list of parameters or an interface. The interface could be an Itf-N interface.

According to another exemplary embodiment of the present invention, a Management Apparatus may be provided. The Management Apparatus may comprise a Reading Device for reading-out information, which information may represent the type of the executed automated function. The information may be read-out from a predefined storage area of a record carrier. Furthermore the Management Apparatus may comprise a Determining Device, which may be adapted for determining employing an automated function using the information, which may have been read-out. Thus, the read-out information may provide information to the Determining Device, which information may allow for determining that an automated function may have been employed or executed.

In an example, the Reading Device may be adapted for detecting the execution of an automated function, e.g. by receiving a corresponding message, e.g. a notification message or an alarm message.

According to yet another exemplary embodiment of the present invention, a computer-readable medium may be provided comprising program code, which program code, when being executed on a processor may be adapted to carry out at least one method of the inventive method for detecting employing an automated function within a communication network and the method for detecting in a Management Apparatus employing an automated function within a communication network.

According to another exemplary embodiment of the present invention, a data structure may be provided which may base on the 3GPP TS 32.662 standard. The data structure may comprise a parameter for storing within a network a type of an executed automated function and the parameter may be addressable by an address scheme based on an object definition. The object definition may allow controlling a Reading Device such to allow the Reading Device to find information associated with the parameter stored in a data structure, and more particularly on a record carrier described or structured by the data structure. In an example the data structure may be an object model.

According to another exemplary embodiment of the present invention, a record carrier may be provided, wherein the record carrier may comprise a storage area e.g. a register for storing a type of an executed automated function. The automated function may have been executed within the network and may be the cause for an amended network configuration. The storage area may be addressable by an address scheme based on an object definition or on an object model. In other words, the object definition may allow addressing a physical storage area such that a desired parameter can be accessed. Thus, the object model may allow positioning a Reading Device and/or a Writing Device to an appropriate storage area of the record carrier. The storage area may be a storing unit in a physical memory.

Examples for a record carrier and/or for a computer-readable medium may be a floppy disk, a hard disk, a USB (Universal Serial Bus) Storage Device, a RAM (Random Access Memory), a ROM (Read Only Memory) or an EPROM (Erasable Programmable Read Only Memory). A computer-readable medium may also be a data communication network, e.g. the internet, which may allow downloading a program code.

According to another exemplary embodiment of the present invention, a program element may be provided, which when being executed by a processor may be adapted to carry out at least one of the inventive methods for detecting employing an automated function within a communication network and a method for detecting in a Management Apparatus the employment of an automated function within a communication network.

In a self managed network, the execution of a network management task may be triggered by an automated function or by an automated functionality, in particular by a self-X functionality within a network. This self-X functionality, automated function or automated functionality may comprise rearranging and reconfiguring of network elements in order to adapt the network to a changed situation. The execution of a self-X functionality may comprise creation of a corresponding Managed Object.

Changing a network configuration may have different reasons. The reason may be a configuration reason, an optimization reason, a healing reason or an automated software management reason. In other words, the network itself may react to amended conditions, such as added network nodes, to amended software versions, to failures and the network may try to cope with the amended situation by itself. Such automated behaviour or self-X functionality may reduce the workload of a network operator who may be responsible for keeping the network alive.

In a self managed network or in a network having self-X functionalities a control circuit, a closed loop or an open loop control may exist for regulating respectively controlling the self-X functionality. A self-managed network, in particular the control circuit, may comprise a measurement apparatus which may be adapted for measuring additional parameters of the network. The self-managed network may also comprise predefined messages exchanged between the network elements (NE), in a case, where the self-x functionalities may be distributed over some locally separated NEs. This may be called a distributed or decentralized architecture. The messages may be exchanged between the NEs, in particular the NEs having self-X functionalities, and the messages may bypass an interface (e.g. Itf-N) to a management system. Thus, the management system may substantially not be involved in executing self-X functionalities.

The measurements may be executed in real-time and/or statistically. For gathering statistical measurements, data such as measurement values may be collected over a predefined period of time and evaluated. The data may be used in order to determine progressions of curves relating to using resources or to determine statistics relating to using resources. The data may be gathered over a period of a day, of a week or of a month. The measurement values are generated by sampling the value of interest, e.g. the use of a resource, in regular time intervals. The value of interest may be sampled in a raster of 15 minutes.

In a self-X network control circuit, apparatuses may exist, which may be adapted for setting up a value range, within which value range the self-X functions may be allowed to decide on their own about choosing predefined parameter. The control apparatuses may be also allowed to influence the time behavior of the self-X function within a predefined parameter range.

However, handling reconfiguration by the network or reacting to fault scenarios by the network may leave the operator "in the dark" about what's going on inside the network. Thus, the operator may not have all information required for identifying the actual status of the network. Therefore, self-X functionalities could make the network intransparent for a network operator. There may not be a possibility to identify which of the changes in the network may have been triggered by a self-X functionality. Therefore, a network operator may see that something happened inside the network but may not receive information about the cause, the root cause or the reason about why something may have happened within the network. In particular, the network operator may not know why a self-X functionality may have been executed. In other words, the operator may see that an automated function may have been executed but may not be able to find out information about the cause of executing or employing that function.

The same may be true for a configuration management, for a network management or for a network management system (NMS) which may also only see an amended network configuration compared with an initial network configuration. But, the NMS may not know the reason for the amended configuration and may believe the amended configuration to be the result of a malfunction of the network. In that case the NMS could try to heal or reconfigure the network configuration in order to reach the initial network configuration. In an example, the NMS and the self-X function could work against each other.

Therefore, indicating the reason for amendments may allow an operator or a network management system to understand that an amended network configuration may be the result of a self-X functionality. This may allow the NMS to ignore an amended configuration.

According to an example the automated function may exclude employing a network management system. The network, for example the communication network or mobile communication network may not involve the network management system for reconfiguring the network when an amended situation may appear.

The network itself, i.e. the network elements themselves or a self-healing server, may try reconfiguring the network without involving a network management system. Thus, the network management system may handle network management objects without taking care about the reasons for amendments which may go on inside the network. Thus, on the one hand the load for a network management system may be reduced, however on the other hand, the network may become intransparent for the network management system. The automated functions or the self-X functions may be executed without involving the network management system.

According to yet another exemplary embodiment of the present invention, the type of the automated function may be at least one type of a self-X function selected from the group of types of self-X functions consisting of self-configuration, self-optimization of interference coordination, automatic neighbour list management, self-optimization load balancing, self-optimization Interference Coordination, self-optimization of Random Access Channel (RACH), self-optimization of capacity, self-optimization of coverage, self-software management and self-healing.

In an example, Interference Coordination may be adapted to reduce the impact of interference between at least two neighbor cells.

Automatic neighbor list management (ANR) may be adapted for keeping a list of corresponding neighbor cells up to date. The list may automatically be updated by a corresponding self-X function. For example, when the installation and commissioning of a new base station may be detected, the Automatic Neighbor List Management function may do an up-date of a corresponding list, of a database, of a repository or of an inventory.

In an example self-configuration may comprise reconfiguring a network to environmental conditions, which may have changed.

In another example self-optimization of Interference Coordination (IC) may be provided. Self-optimization Interference Coordination may comprise adapting interference between communication connections of UEs (User Equipment) or of MSs (Mobile Stations) with Base Stations (BS) to a balanced situation.

In another example load balancing may comprise transferring a user to another base station or handing over a user, a mobile station or a user equipment to another base station (hand-over) such that connections within the network may be balanced.

Self-optimization of handover parameter may also comprise handing user equipment from one base station to another. In an example Self-optimization of handover parameter may comprise setting-up the conditions for triggering an handover. This may comprise setting up a threshold for triggering handing over of a MS from one base station to another base station.

In another example the automated function may comprise optimization of the random access channel (RACH).

The RACH may be a channel used by user equipment such as a cellular phone or a mobile station for contacting a base station. In a case where the number of requests for connections may be higher than the available resources or channels, not every request may be satisfied. On the other side, providing too much resources or channels may mean losing too much bandwidth for actually usable data channels using the same frequency. Thus, RACH optimization may comprise finding a trade-off between available channels and used bandwidth.

In another example the automated function may comprise optimization of a capacity and/or optimization of coverage.

In yet another example the automated function may comprise software management such as a release control or verifying the correct software version.

In another example the automated function may comprise self-healing which may allow reacting to a failure situation.

According to another exemplary embodiment of the present invention the storage area of the record carrier, the parameter or the data structure may be addressed by a sourceIndicator parameter of at least one method and/or message selected from the group of methods and/or messages according to the 3GPP standard TS 32.662, the group of methods and/or messages may consist of a notifyObjectCreation method, a notifyObjectDeletion method and a notifyAttributeValueChange method. In an example, the method may be a list of parameters and/or an interface description comprising a list of parameters. The corresponding storage area may be adapted for storing a cause for executing a self-X function. In an example, the cause may be represented by a bit pattern.

An object or managed object may represent stored data or may help addressing stored data. An object may allow accessing the stored data on a record carrier or in a memory. The object may allow defining an addressing scheme for a record carrier, for a computer-readable medium, for a storage or for memory allowing to find information which may have been put into the storage.

According to another exemplary embodiment of the present invention, the method of detecting employing an automated function within a network may comprise writing information, which may allow specifying the employed automated function in more details. Such detailed information may be stored in a further predefined storage area of the record carrier addressable by the object.

An additional storage area for additional information may allow in more detail describing a cause, a root cause or a reason which may have made necessary employing or conducting corresponding self-X functionality. The additional storage area may allow providing more detailed information to a network management system to inform the network management system about the reasons for the executed automated function.

According to another exemplary embodiment of the present invention, the further predefined storage area may be a further parameter or may correspond to a further parameter of at least one method and/or message of the group of methods and/or messages according to the 3GPP standard TS 32.662 consisting of a notifyObjectCreation method, a notifyObjectDeletion method and a notifyAttributeValueChange method.

A method may be a method according to an object oriented architecture.

According to yet another exemplary embodiment of the present invention, the method may further comprise communicating the information representing the type of the executed automated function between an Agent Apparatus and a Management Apparatus and/or between an Agent Apparatus and a self-X server.

The information can be communicated on the basis of a subscription. Communicating the detailed information may allow informing a corresponding Management Apparatus, an NMS and/or a self-X server about the internal behaviour of the network and about the steps which may have been conducted in the network and in addition to the reason why the corresponding steps may have been conducted. This may make the internal behaviour of the network more transparent to a Management Apparatus, e.g. to an NMS or to a self-X server. Thus, information may be provided about the cause which may have triggered reconfiguring the network or executing an automated function within the network. Thus, a communication relationship between the network and administrative instances such as network management or self-X server can be established in order to clarify the reasons for an actual network configuration.

In an example an NMS may have an initial network configuration and may be surprised if the initial network configuration may differ or distinguish from the actual network configuration. In order to clarify the reasons which may have led to this difference, a communication relationship with the network and in particular with an agent inside the network can be established. In an example a manager e.g. an IRPManager (Integration Reference Point Manager) may establish a communication relationship with an agent inside the network e.g. an IRPAgent (Integration Reference Point Agent). A communication between the agent and the manager may use an established or subscribed interface, for example an Itf-N interface. In an example the Itf-N interface may be an interface between an Agent Apparatus and a Management Apparatus.

According to another exemplary embodiment of the present invention, the Agent Apparatus, e.g. the IRPAgent, may be contained or integrated in at least one Network Apparatus selected from the group of Network Apparatuses consisting of an Element Management System (EM), a Network Element (NE), a server, a self-healing server or self-healing client, a self-X server or self-X client, a BTS (Base Transceiver Station), an RNC (Radio Network Controller), a NodeB and an eNodeB. In an example the eNodeB may be a macro eNodeB, a home NodeB or femto eNodeB.

The agent and/or the manager may base on at least one standard selected from the group of standards consisting of GSM (Global System for Mobile communication), UMTS (Universal Mobile Telecommunication System) and LTE (Long Term Evolution). In particular, the agent and/or manager may use objects corresponding to the relevant standards.

According to another exemplary embodiment of the present invention, a program element may be provided which, when being executed by a processor is adapted to carry out at least one method of the method for detecting employing an automated function within a communication network and the method for detecting in a Management Apparatus employing an automated function within a communication network.

In other words, after an automated function may have been executed information about the reason or the cause for conducting an automated configuration may be provided by the network in order to transparently inform a management system or any other instance which may be interested about the internal behaviour of the network.

It has also to be noted that exemplary embodiments of the present invention and aspects of the invention have been described with reference to different subject-matters. In particular, some embodiments have been described with reference to apparatus type claims whereas other embodiments have been described with reference to method type claims. However, a person skilled in the art will gather from the above and the following description that unless other notified in addition to any combination between features belonging to one type of subject-matter also any combination between features relating to different subject-matters in particular between features of the apparatus claims and the features of the method claims may be considered to be disclosed with this application.

These and other aspects of the present invention will become apparent from and elucidated with reference to the embodiments described hereinafter.

Exemplary embodiments of the present invention will be described in the following with reference to the following drawings.

DETAILED DESCRIPTION

The illustration in the drawings is schematic. In different drawings, similar or identical elements are provided with the same reference numerals.

Figure 1:
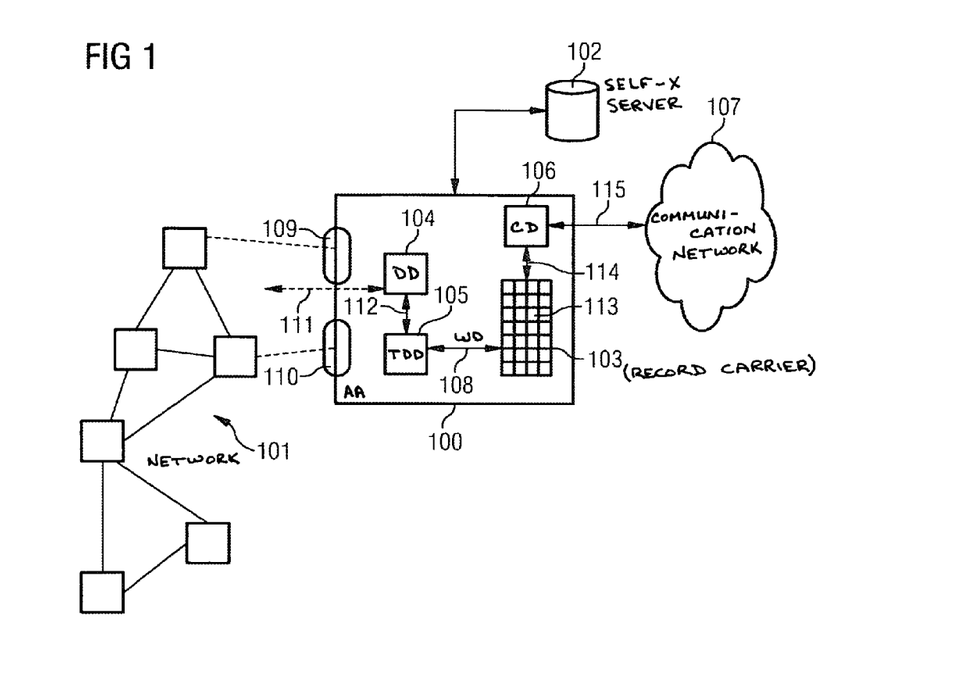
FIG. 1 shows a block diagram of an Agent Apparatus according to an exemplary embodiment of the present invention.

FIG. 1 shows a block diagram of an Agent Apparatus according to an exemplary embodiment of the present invention.

The Agent Apparatus 100 comprises the Detecting Device 104, the Type Determining Device 105 and the Writing Device 108. The Detecting Device has contact with the network 101 via interfaces 109 and 110. In an example the Agent Apparatus is contained in a network element, e.g. a network node or a base station, of the network 101. As symbolically shown with dotted line 111 the Detecting Device 104 is able to detect the execution or employment of an automated function or of a self-X function inside the network 101. In an example the Detecting Device detects finishing of an automated function. For example, the Detecting Device is in communicating contact with the self-X server 102 which may initiate the self-X functionality inside the network and inform the Agent Apparatus 100 when the self-X functionality has been executed. In other words, the Detecting Device is adapted to monitor the network 101 for amendments.

The Agent Apparatus 100 may be part of the network 101. Via network interfaces 109, 110 the Agent Apparatus 100 or network node 100 may be in contact with communication network 101.

In a case where the Detecting Device 104 detects auto-configuration or reconfiguration inside the network 101 the Detecting Device 104 reports such an amendment via connection 112 to the Type Determining Device 105. The Type Determining Device is responsible for determining the type of the automated function which has been executed. In other words, the Type Determining Device detects an indication of a self-X process as reason for data change in a network. A data change may be detected when a parameter in a network element have been changed.

Thus, the Type Determining Device may allow identifying which changes in a network were triggered by self-X functionalities. The Type Determining Device can further be adapted to determine the type of an employed self-X functionality and more details about the reasons for executing the self-x functionality. Examples for different types of self-X functionalities are self-configuration, self-optimization, self-healing and automated software management etc. In other words, as soon as the network itself becomes active concerning the configuration of the network, the activities are registered in the Agent Apparatus.

The Type Determining Device 105 uses the Writing Device 108 for writing information representing the type of the automated function, the type of the corresponding detected self-X functionality or the cause for executing the automated function in a predefined storage area of the record carrier 103. In an example the record carrier may be a memory, a RAM or an EPROM which may be adapted to receive information from the Type Determining Device.

The Writing Device 108 may be controlled by an addressing scheme which may be defined as an object model, in order to find the corresponding predefined position or location of the storage area of a record carrier. FIG. 1 shows an example of a predefined storage area 113. In other words, the object definition may be used in order to position the Writing Device to the storage area in order to write the type of the detected self-X functionality, which was executed within the network 101. The Management Apparatus can use the same object model to control a Reading Device to the corresponding storage area in order to read-out the type or cause of the executed self-x function.

The Writing Device and/or the Reading Device may be adapted to access a storage area next to a storage area for storing information about additional text or correlated notifications i.e. a set of notifications that are correlated to the subject notification.

The bidirectional link 114 connects the record carrier 103 to the Communication Device 106 which Communication Device 106 is adapted for communicating information representing the type of the automated function between the Agent Apparatus 100 and a Management Apparatus (not shown in FIG. 1) and/or between the Agent Apparatus 100 and a self-X server 102. In an example the Communicating Device 106 may comprise a Reading Device for accessing a predefined storage area 113 of the record carrier 103. For controlling or positioning the Reading Device to access the predefined storage area 113 the Communicating Device 106 may use the same object model as the Writing Device 105. In an example the Communicating Device, in particular the integrated Reading Device of the Communicating Device 106 may be controlled by a Management Apparatus which may request the information detected by the Detecting Device 104. For communicating with a Management Apparatus or with a NMS the Communicating Device 106 uses the bidirectional network connection 115 which is connected to the communication network 107.

Figure 2:
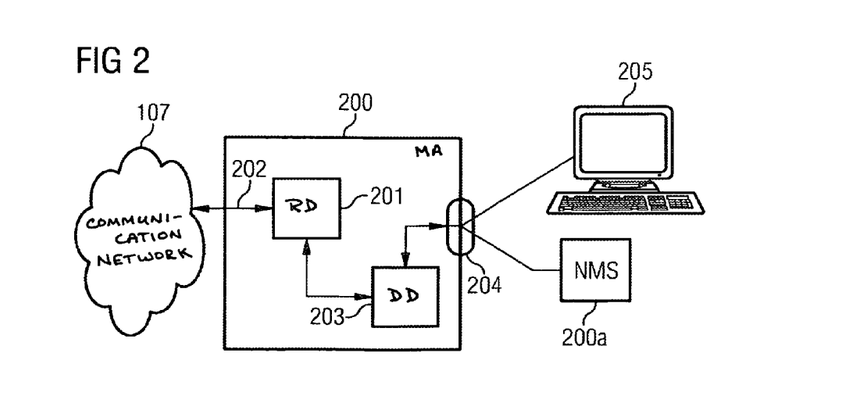
FIG. 2 shows a block diagram of a Management Apparatus according to an exemplary embodiment of the present invention.

FIG. 2 shows a block diagram of a Management Apparatus 200 according to an exemplary embodiment of the present invention.

The Management Apparatus 200 or NMS 200 comprises a Reading Device 201. The Reading Device 201 of the Management Apparatus 200 in an example can control a Communicating Device 106 in particular an integrated Reading Device of an Agent Apparatus 100 (not shown in FIG. 2).

In another example the Reading Device 201 is adapted for reading out information representing the type of an automated function from a predefined storage area of a record carrier contained in an Agent Apparatus 100. In order to read out the record carrier (not shown in FIG. 2) the Management Apparatus 200 can establish via the bidirectional network link 202 and via the communication network 107 a connection to an Agent Apparatus 100.

In an example the communication connection 115, 202 may be established via an Itf-N interface. In other words, via the network interface 202, 115 or itf-N interface 202,115 the Management Apparatus 200 may establish a connection to an Agent Apparatus 100. In other words, the Management Apparatus 200 may subscribe to an Agent Apparatus 100, to an event manager or to an event forming instance. In an example the Management Apparatus is an IRPManager 200 and the Agent Apparatus is an IRPAgent 100.

The Reading Device 201 can determine the type of an automated function executed within a network 101 (not shown in FIG. 2) and can forward the gathered information to the Determining Device 203. The Determining Device 203 is adapted for determining that in a network 101 an automated function has been employed or executed.

For determining that an automated function has been employed inside a network 101, the Determining Device 203 uses information read out by the Reading Device 201. In other words, the Determining Device can access the record carrier 103 of an Agent Apparatus 100. Thus, the Determining Device can be informed about the type of self-X function which has been employed inside a network 101. The Determining Device 203 is adapted to determine that an automated function has been executed in the network 101 and/or what type of function has been executed and/or what cause has been the reason for executing the automated function.

The information determined by Determining Device 203 can be communicated via the communication port 204, common port 204 or management port 204 to another management system 200a or to a user terminal 205. Thus, either a management system 200a or an operator can be informed of the type of self-X functionality which has been executed inside the network 101. Thus, an indication of a self-X process as reason for data change inside the network 101 can be communicated to the user terminal 205 or to an NMS system 200a. This information may make transparent what is going on inside the network 101. Thus, via the communication interface 204 information can be provided about activities or amendments inside the network 101.

In other words, a network operator using the user terminal 205 is able to identify which changes in his network were triggered by self-X functions.

Table Tab.1 shows an example for a data structure which can be used to address a predefined storage area of a record carrier 103. Tab.1 shows a notifyObjectCreation method. This notifyObjectCreation method is an optional method and may base on the 3GPP standard TS 32.662. An IRPAgent 100 notifies an IRPManager 200 about the fact that a new Managed Object has been created using the notifyObjectCreation method. The IRPManager may be subscribed via link 202, 115 and via network 107 to the IRPAgent. Thus, information or notification is sent from the IRPAgent to the IRPManager 200 as soon as the Writing Device 108 has written the type of the automated function or the type of the detected self-X function in the record carrier 103. The type of the self-x function may be associated with a reason for executing this self-x function. A Notification Header may be a link to parameters of a technical standard.

The creation of a new managed object may only be communicated from the IRPAgent 100 to the IRPManager 200 if the new object satisfy a filter constraint expressed in an IRPManagers subscribe operation which has been used to establish a communication connection between the IRPAgent 100 and IRPManager 200. Table Tab.1 shows input parameters of the notifyObjectCreation method, of the notifyObjectCreation notification or of the notifyObjectCreation message. Executing the corresponding method (e.g. notifyObjectCreation, notifyObjectDeletion, notifyAttributeValueChange) with the corresponding input parameters, results in sending these parameters as a notification to a manager.

Table Tab.1 comprises four columns. The first column shows a parameter name, the second column shows a qualifier, the third column shows matching information and the fourth column shows a comment. Thus, the parameters or the object description shown in Tab.1 may correspond to an addressing scheme for the record carrier 103. A predefined storage area 103 may correspond to a certain parameter as indicated in column 1 of Tab.1.

A matching information may be a filter parameter which may allow defining which messages or notification should be visible to a NMS 200, 200a or to an operator 205. This matching mechanism may allow determining which information may be written into a log file for online or off line processing. The matching information may be a data type for the corresponding filter.

For example, the notifyObjectCreation comprises an object class which can carry the managed entity class name.

In other words, the notificationObjectCreation or notifyObjectCreation method, as well as the notifyObjectDeletion and/or the notifyAttributeValueChange may describe which parameter may be notified when an Object may be created, deleted or when corresponding attributes may be amended. This may relate to a notification IRP as described in the 3GPP standard TS 32.302. The methods may be predefined subscriptions to an event forming mechanism.

Furthermore, the notifyObjectCreation comprises the parameter object instance notificationId, eventTime, systemDN, notificationType, correlatedNotifications.

The optional parameter correlatedNotifications can be used for listing further notifications which originate from the same event. This information about the origin could be used in a self-X function.

TABLE 1

| Parameter Name | Qualifier | Matching Information | Comment |
|---|---|---|---|
| objectClass | M, Y | ManagedEntity.objectClass | Notification header. It shall carry the ManagedEntity class name. |
| objectInstance | M, Y | ManagedEntity.objectInstance | Notification header. It shall carry the DN of the ManagedEntity. |
| notificationId | M, N | — | Notification header |
| eventTime | M, Y | — | Notification header. It shall carry the ManagedEntity creation time. |
| systemDN | C, Y | — | Notification header |
| notificationType | M, Y | Mapped to a notificationType | Notification header. |
| correlatedNotifications | O, N | — | A set of notifications that are correlated to the subject notification. |
| additionalText | O, N | — | It can contain further information in text on the creation of the MO. |
| sourceIndicator | O, N | ENUM( Resource_operation, Management_operation, Self_configuration, Self_optimization_IC, ANR List Management, Self_opt_load balancing, Self_opt_HO_parameters, Self_opt_IC, Self_opt_RACH, Self_opt_Capacity, Self_opt_Coverage, Self_optimization, Self_healing, Unknown) | This parameter, when present, indicates the source or cause of the operation that led to the generation of this notification. It can have one of the following values:<br>1. resource operation: The notification was generated in response to an internal operation of the resource;<br>2. management operation: The notification was generated in response to a management operation applied across the managed object boundary external to the managed object;<br>3. self configuration: The notification was generated as result of a self configuration process.<br>4. self opt_IC: The notification was generated as result of a process dealing mainly with self-optimizaton of Interference Coordination.<br>5. self opt_load_balancing: The notification was generated as result of a process dealing mainly with self-optimizaton of load balancing<br>6. self opt_HO_parameters: The notification was generated as result of a process dealing mainly with self-optimizaton of Handover parameters.<br>7. self opt_RACH: The notification was generated as result of a process dealing mainly with self-optimizaton of RACH. |

TABLE 1-continued

| Parameter Name | Qualifier | Matching Information | Comment |
|---|---|---|---|
| | | | 8. self opt_capacity: The notification was generated as result of a process dealing mainly with self-optimizaton of capacity.<br>9. self opt_coverage: The notification was generated as result of a process dealing mainly with self-optimizaton of coverage.<br>10. self optimization: The notification was generated as result of a process dealing self-optimizaton (where a allocation to the above mentioned purposes cannot be made)<br>11. self healing: The notification was generated as result of a self-healing process.<br>12. unknown: It is not possible to determine the source of the operation. |
| attributeList | O, N | LIST OF SEQUENCE <AttributeName, AttributeValue> | The attributes (name/value pairs) of the created MO. |

In a sequence starting with objectClass, the notifyObjectCreation comprises an additionalText parameter following the parameter correlationNotifications. This additionalText parameter can be an optional parameter.

In the tables O may be used for indicating an optional parameter, M may be used for mandatory parameters.

N means that the parameter cannot be used for a filter operation and Y means that the parameter can be used for a filter operation.

The additionalTextparameter or additional text parameter can contain further information in text on the creation of the MO (Managed Object).

A Managed Object is a representation of a real object in a database. A person may be represented in an operator database as a subscriber object. A physical eNodeB (eNB) may be represented by a ManagedObject (MO) eNBfunction.

The parameter additional text may be used for any additional text which may not be defined by a standard.

The parameter additional text can for example contain an identifier that allows identifying which self-X process triggered an event. For example, the object creation, object deletion and attribute value change can be an event.

Furthermore the notifyObjectCreation method comprises a parameter sourceIndicator. This is an optional parameter which can have a matching information or a value selected from Resource_operation, Management_operation, Self_configuration, Self_optimization_IC, ANR_list_management, Self_opt_load_balancing, Self_opt_HO_parameters, Self_opt_IC, Self_opt_RACH, Self_opt_capacity, Self_opt_coverage, Self_optimization, Self_healing, unknown.

The sourceIndicator parameter or source indicator parameter when present indicates the source of the operation that led to the generation of the corresponding notification (e.g. notifyObjectCreation). The source indicator indicates the type of an automated function or a self-X function which have been executed inside a network.

The values resource_operation, management_operation, unknown may be extended or augmented by values of automated functions such as the values self-configuration, self-optimization, self-healing, automated software management, Self_configuration, Self_optimization_IC, ANR_list_management, Self_opt_load_balancing, Self_opt_HO_parameters, Self_opt_IC, Self_opt_RACH, Self_opt_capacity, Self_opt_coverage, self_optimization, Self_healing. Other names of other automated function may also be comprised in the source indicator. Thus, the source indicator may indicate the source of self-X functionality.

The sourceIndicator can have for example the value Resource_operation. The source indicator has the value Resource_operation, if the notification was generated in response to an internal operation of the resource.

The sourceIndicator may have the value Management_operation if the notification was generated in response to a management operation applied across the managed object boundary external to the managed object.

The sourceIndicator has the value Self_configuration if the notification was generated as a result of a self-configuration process.

The sourceIndicator has the value Self_opt_IC, if the notification was generated as result of a process dealing mainly with self-optimization of Interference Coordination (IC).

The sourceIndicator has the value Self_opt_load_balancing if the notification was generated as a result of a process dealing mainly with self-optimization of load balancing.

The sourceIndicator or the type of automated functions may have a value of Self_opt_HO_parameters if the notification was generated as a result of a process dealing mainly with self-optimization of Handover parameters.

The sourceIndicator or type of a self-X function may have the value of Self_opt_RACH if the notification was generated as a result of a process dealing mainly with self-optimization of RACH.

The sourceIndicator may have the value of Self_opt_capacity if the notification was generated as result of a process dealing mainly with self-optimization of capacity.

In an example the sourceIndicator may have the value Self_opt_coverage if the notification was generated as a result of a process dealing mainly with self-optimization of coverage.

The sourceIndicator may have the value Self_optimization if the notification was generated as a result of a process dealing with self-optimization, where an allocation to the above-mentioned purposes cannot be made.

The sourceIndicator may have a value or type of Self_healing if the notification was generated as a result of a self-healing process.

The sourceIndicator may have a value of unknown if it is not possible to determine the source of an operation.

Thus, the value of sourceIndicator represents the source of operation, i.e. the name of the type of operation.

Furthermore, the notifyObjectCreation method may comprise a parameter attributeList which is a list of a sequence comprising AttributeName and AttributeValue for the attributes (name/value pairs) of the created MO. Example for name and/or value pairs may be forename and surname of a subscriber of a network operator.

Self_configuration could mean bringing a new eNodeB in the field and providing the eNodeB automatically with commissioning parameter.

An example for Self_opt_IC could comprise detecting interferences on a frequency and determining the cause for the interference in a neighbor cell. This may be done by reducing the transmission power. As all self-X functions, the Self_opt_IC functions without involving the NMS, i.e. substantially any communication via the Itf-N interface may be prevented for executing a self-X function.

Self_opt_load_balancing can comprise regularly receiving an alarm message reporting an overload situation of a cell. Free capacities of a neighbor cell can be used by reducing an angle of the antenna of the overloaded cell and thus reducing the footprint of the cell. The load may be reduced since the footprint of the cell may be reduced and load may be taken over by neighbor cells having free capacity.

The Self_opt_HO_parameter for indicating that HO optimization has been executed. HO optimization can be used if a handover statistic shows that in a region, e.g. at the border of two cells, a so called "ping-pong" handover is regularly executed. A MS or mobile phone regularly changes the connection from one base station to another. A self-X functionality can for example increase a hysteresis for the handover threshold in order to prevent this ping-pong handover.

Self_opt_capacity could be employed if not all available channels are used. A reason for not using all channels may be saving energy. However, if in a corresponding cell the number of users has been increased additional channels of the unused channels could be activated.

Self_opt_coverage could be executed if measurements show that some areas are not covered by radio signals of cells and therefore, in these areas receiving radio signals is not possible. The self-X functionality Self_opt_coverage can react with increasing the transmitting power of a base station. The self-X functionality or the network decides about how to react on its own. A communication via an Itf-N interface or a network management system interface can be prevented.

The Self_opt_RACH functionality could detect that the available RACH channels are not fully occupied. Thus, employing the Self_opt_RACH functionality can result in using at least one of the light loaded RACH channels as a data channel.

A Self_healing functionality can reconfigure neighbor cells in order to replace a defective or failed cell. When a cell fails in the neighbor cell the transmit power may be increased and/or the angle of an antenna can be reduced such, that the footprint of the failed cell may be supplied substantially by the adapted cell. Self healing will be described in more detail in FIGS. 3a-3b.

Using the different values for parameter sourceIndicator may allow identifying the source of a self-X functionality. The different values may be represented by different bit patterns. In other words, the source indicator may allow identifying which changes in the network were triggered by self-X functionalities.

Table Tab.2 shows input parameters of a notifyObjectDeletion method. The input parameters or the list of input parameters comprise in accordance with the notifyObjectCreation method the additional text parameter and/or the source indicator parameter as defined in table Tab. 1.

The IRPAgent 100 notifies the subscribed IRPManager 200 of a deleted managed object using the notifyObjectDeletion method. The managed objects represent real physical objects such as subscriber of a network operator. A subscriber object may be created when the subscriber subscribes to an operator and may be deleted when the subscriber withdraws the subscription. Managed objects can be created, changed and/or deleted by using the corresponding method. The method may be utilized by an agent and/or by a manager. The agent and/or manager can be controlled by rules.

The IRPAgent invokes the notifyObjectDeletion notification because the subject notification satisfies a filter constraint expressed in the IRPManager subscribe operation. This notification is sent from the IRPAgent 100 to the IRPManager 200.

TABLE 2

| Parameter Name | Qualifier | Matching Information | Comment |
| --- | --- | --- | --- |
| objectClass | M, Y | ManagedEntity.objectClass | See Tab. 1 |
| objectInstance | M, Y | ManagedEntity.objectInstance | See Tab. 1 |
| notificationId | M, N | — | See Tab. 1 |
| eventTime | M, Y | — | Notification header. It shall carry the ManagedEntity deletion time. |
| systemDN | C, Y | — | See Tab. 1 |

TABLE 2-continued

| Parameter Name | Qualifier | Matching Information | Comment |
| --- | --- | --- | --- |
| notificationType | M, Y | Mapped to a notificationType. | See Tab. 1 |
| correlatedNotifications | O, N | — | See Tab. 1 |
| additionalText | O, N | — | See Tab. 1 |
| sourceIndicator | O, N | See Tab. 1 | See Tab. 1 |
| attributeList | O, N | LIST OF SEQUENCE <AttributeName, AttributeValue> | The attributes (name/value pairs) of the deleted MO. |

When a managed object is deleted, all subordinate Managed Objects, i.e. the complete sub-tree of a MIB, are also deleted. Furthermore, all associations where the Managed Object participates are deleted.

Table Tab.3 shows the input parameters of a notifyAttributeValueChange method. The use of the notifyAttributeValueChange method may be explained using an example of the self-X process or the self-X function Self_opt_coverage. The Self_opt_coverage process in the example triggers increasing the physical transmit power of a physical eNodeB. The physical eNodeB is represented by associated objects. In the case of increasing the transmit power of an eNodeB a value of a parameter representing the transmit power in an associated eNBfunction object may be changed. This change in the eNBfunction is notified using the notifyAttributeValueChange, when the change have been detected.

The definition of the parameter additional text as of Tab.1, Tab.2 and Tab.3 used in notifications notifyObjectCreation, notifyObjectDeletion and notifyAttributeValueChange may be extended to the description that the parameter additional text can e.g. contain an identifier that allows identifying which self-X process triggered the event.

In an alternative example the additional text parameter could be used to introduce a specific new parameter or a further parameter to indicate an identifier that allows identifying which self-X process triggered the event. Thus, a separate parameter may be added to table Tab.1, Tab.2 and/or Tab.3 which can e.g. contain an identifier that allows identifying which self-X process triggered an automated function.

An object as defined in 3GPP TS 32.662 may be reused.

For notifyObjectCreation, notifyObjectDeletion and/or notifyObjectAttributeValueChange notifications which are

TABLE 3

| Parameter Name | Qualifier | Matching Information | Comment |
| --- | --- | --- | --- |
| objectClass | M, Y | ManagedEntity.objectClass | See Tab. 1 |
| objectInstance | M, Y | ManagedEntity.objectInstance | See Tab. 1. |
| notificationId | M, N | — | See Tab. 1 |
| eventTime | M, Y | — | Notification header. It shall carry the attribute(s) value(s) changed time. |
| systemDN | C, Y | — | See Tab. 1 |
| notificationType | M, Y | Mapped to a notificationType. | See Tab. 1 |
| correlatedNotifications | O, N | — | See Tab. 1 |
| additionalText | O, N | — | See Tab. 1 |
| sourceIndicator | O, N | See Tab. 1 | See Tab. 1 |
| attributeValueChange | M, N | LIST OF SEQUENCE <AttributeName, NewAttributeValue, CHOICE [NULL, OldAttributeValue] > | The changed attributes (name/value pairs) of the MO (with both new and, optionally, old values). |

The notifyAttributeValueChange method also comprises the additional text parameter and/or source indicator as described in table Tab.1. The structures of the notifyObjectCreation, the notifyObjectDeletion and the notifyAttributeValueChange method correspond to each other.

The IRPAgent 100 notifies the subscribed IRPManager 200 about a change of one or several attributes of a managed object in the NRM (Network Resource Model). The NRM is a description or definition of objects, the content of the objects and the relations between the objects. The IRPAgent 100 invokes the notification because the subject notification satisfies a filter constraint expressed in the IRPManager 200 subscribe operation. The filter mechanism can be integrated in the Writing Device of an agent and/or in the Reading Device of a manager.

triggered by a self-configuration functionality the value Self-configuration shall be used for the input parameter sourceIdentifier.

Figure 3A:
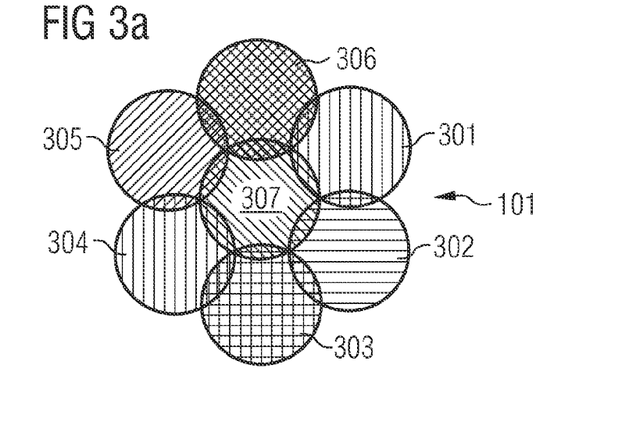
FIGS. 3a to 3c show different stages of a self-X process according to an exemplary embodiment of the present invention.
Figure 3B:
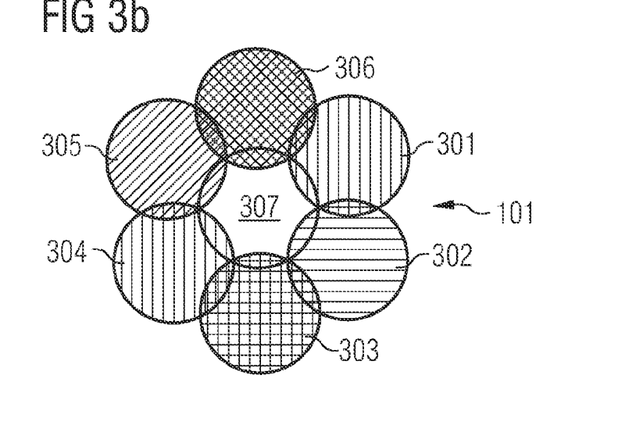
Figure 3C:
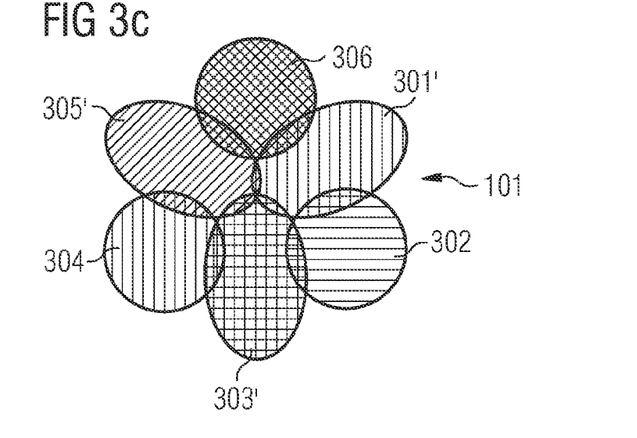

FIGS. 3a to 3c show employing a self-X process in a network according to an exemplary embodiment of the present invention.

FIG. 3a shows a scenario where seven different cells 301, 302, 303, 304, 305, 306, 307 generate a communication network 101 or a footprint of a cellular communication network. In other words, the seven cells 301 to 307 are generated by seven antennas of base stations if all antennas and/or all base stations are working. In the following the terms cell and base station may be similarly used.

FIG. 3b shows the network scenario 101 of FIG. 3a where one base station 307 has failed according to an exemplary embodiment of the present invention. In FIG. 3b the middle base station (BTS) 307 has failed. The failure of base station 307 generates an area 307 which is not covered any more.

FIG. 3c shows a network configuration after executing or employing a self-X function according to an exemplary embodiment of the present invention.

The failure in the network 101 has been detected. For example, a self-X server, not shown in FIG. 3a, 3b, 3c has detected that BTS 307 or cell 307 has been failed. By using self-healing functionalities, self-healing functions or self-healing processes the shape of cells 301', 303', 305' has been adapted such, that the amended shape of the cells now also covers the failed middle cell 307. Self-healing could also be combined with self-configuring. This self-healing or activation of a replacement configuration has been conducted by the network 101 itself or by a corresponding self-healing server 102. A network management system 200 however, may not be informed about the self-healing functionality. The NMS may not be involved in reconfiguring the network 101.

By reading-out the record carrier 103 of a corresponding Agent Apparatus in the network 101 the NMS can identify that self-healing has been executed and that self-healing was the cause for the amended network configuration.

Thus, the informed NMS may not try to change the configuration, since the NMS understands that this was generated by a required self-healing operation in order to cover the missing middle cell 307.

In other words, in the scenario as shown in FIGS. 3a to 3c, the cells or radio cells 301 to 307 cover a predefined geographical area. In the case of FIG. 3a every station 301 to 307 covers a substantially equally sized area.

FIG. 3b shows the failing of one antenna 307 of the cells 301-307. A self-healing server 102 is informed about failing of cell 307. The self-healing server or self-X server 102 has a replacement configuration for such failure scenarios and activates one of the replacement configurations without involving a network management system 200 (NMS). Thus, for executing self-healing exchanging messages via an Itf-N interface substantially be prevented.

This NMS 200 and/or all other NMSs 200a, 200b are informed by a notification having the parameter sourceIndicator set to self_healing (sourceIndicator=self-healing). In other words, an notifyAttributeValueChange method may be invoked with sourceIndicator set to self_healing. This method informs an NMS or an IRPManager 200 about the configuration amendment of every single cell. The sourceIndicator value informs an NMS or an IRPManager 200 about the employment of the self-X function in the network 101. In order to allow that an NMS knows that the single messages of every reconfigured cell belong to the same event, the correlated notifications of the different cells may be listed in the correlatedNotifications parameter of the involved notifications.

The failure of cell 307 can additionally be reported by an alarm notification.

This may prevent the NMS to regard the configuration change in every single cell 301 to 307 as independent and as a violation of a certain configuration policy (e.g. to a policy requiring not to set transmission power higher than a certain value during normal operation). An NMS, which is responsible for the handling of failures, thus has not to inform the other NMS in order to amend the configuration. Thus the NMSs may not receive a notification with source indicator set to management_operation.

Since the amendments have been conducted inside the network and were not triggered by a network management, it is also prevented that the NMSs try to reconfigure the cells 301 to 306.

Thus using the sourceIndicator parameter set to self_healing allows showing to the NMS 200 that without involvement of a network management system the error, i.e. the failed antenna 307, has been handled by a self-healing server 102. This may also prevent that one of the NMSs for example detects the amended configuration of FIG. 3c and may determine a failure in a parameter-policy and may try to reconfigure the scenario shown of FIG. 3c. Every NMS may be informed via the sourceIndicator parameter that the configuration shown in FIG. 3c was initiated by the network which has determined that the configuration has been changed.

Figure 4:
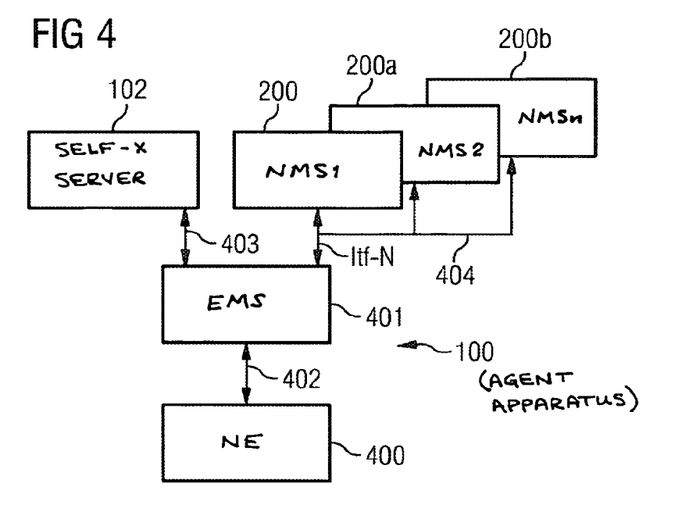
FIG. 4 shows a block diagram of a network management architecture according to an exemplary embodiment of the present invention.

FIG. 4 shows a block diagram of a network management architecture according to an exemplary embodiment of the present invention.

The Agent Apparatus 100 comprises the element management system (EMS) 401 and the network element (NE) 400. The EMS and the NE are in communicating connection 402. The agent 100 may be part of a communication network 101 (not shown in FIG. 4). The self-X server 102, e.g., a self-healing server, is connected via the communication link 403 to the EMS 401.

Furthermore via an Itf-N interface 404 the NMS systems NMS1 200, NMS2 200a and NMS n 200b are connected to the agent 100 or to the EMS 401.

Figure 5:
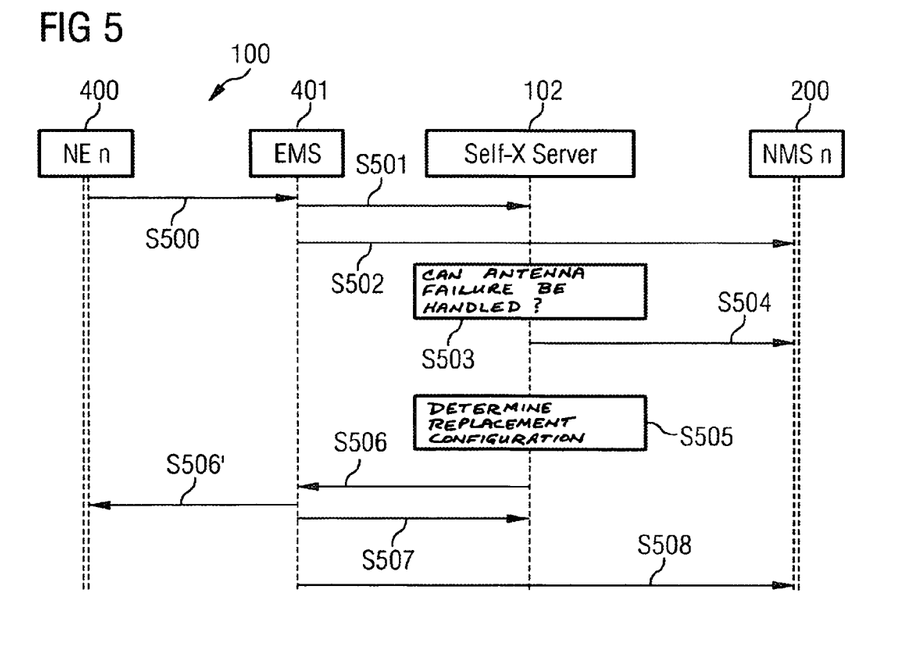
FIG. 5 shows a message flow diagram for exchanging information of an object according to an exemplary embodiment of the present invention.

FIG. 5 shows a message flow diagram for exchanging information of an object according to an exemplary embodiment of the present invention.

The plurality of NEs 400 of a communication network 101, are represented by one NE 400. NE 400 in step S500 sends an alarm message to an EMS 401, in order to inform EMS 401 that an antenna has failed, for example the antenna of cell 307. EMS 401 in step S501 forwards the alarm message from NE 400 to the self-X server 102, for example the self-healing server 102. The EMS 401 in step S502 sends the same alarm message of NE 400 about failing of antenna 307 to at least one NMS 200 of the group of NMSs 200, 200a, 200b.

After the receipt of the alarm message of step S501, in step S503 the self-X server 102 determines that failing of the antenna 307 can be handled by the self-X server 102.

In step S504 the self-X server 102 sends information to the NMS 200 that the self-X server handles the replacement configuration of the failed antenna in the network represented by NE 400. The message sent from self-X server 102 to NMS 200 may comprise an identifier X. The NMS does not care about handling the failure and therefore no further information is sent to the NMS 200 via Itf-N interface while the self-X server 102 organizes the reconfiguration in the network 101.

In step S505 the self-X server 102 determines the replacement configuration and in step S506 the self-X server 102 sends the replacement configuration for a plurality of NEs 400 to the EMS 401. The replacement configuration comprises the identifier X.

The EMS 401 determines the replacement configuration for each NE 400 and sends the corresponding replacement configuration to each individual NE 400 (step S506'). Thus, the self-X server 102 manages the replacement configuration of network 101 by informing corresponding NEs 400 about a new configuration.

In step S507 the EMS 401 or the Agent Apparatus 100 sends a create message, a delete message and a change message, respectively (create/delete/change message) comprising sourceIndicator set to self-healing including—in the parameter additionalText—the identifier X to the self-X server 102.

The identifier X may identify an event with a unique ID or with a unique event number. A configuration-NMS and/or an application assessing log-files can use the identifier X to determine that amendments in the cells 301 to 306 and/or NEs 400 correspond to each other or are based on the same cause. The identifier X could also be used for requesting or reading-out information about the events that were caused by the process and/or event having the identifier X. Further information such as duration of the triggered events, duration of the self-healing process etc. could also be stored or read-out.

The self-X server 102 receives the corresponding message or list of parameters as an answer, acknowledge or response to the replacement configuration sent in step S506.

In parallel to the create/delete/change message, the EMS 401 in step S508 sends the create/delete/change message to the NMS 200. The NMS 200 receives the corresponding message or list of parameters as an information or update message, in order to inform the NMS 200 about the actual configuration or status of the network. In an example, the NMS 200 is informed about the cause for the self-healing function.

In other words, the list of parameters as described in tables Tab. 1 to Tab. 3 may be sent to the self-x server 102 and/or to the NMS 200. The create/delete/change message can be used as acknowledge message or as an information message.

Figure 6:
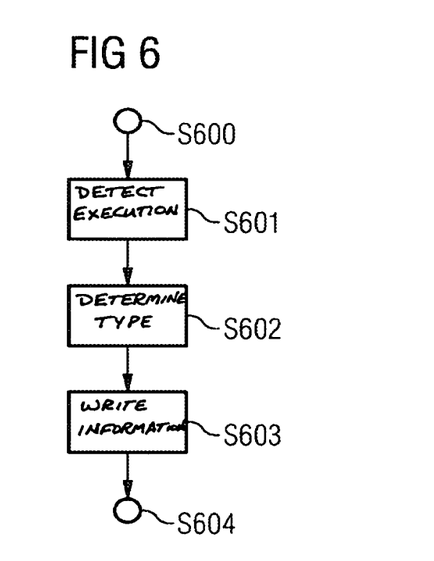
FIG. 6 shows a flowchart of a method for detecting employing an automated function according to an exemplary embodiment of the present invention.

FIG. 6 shows a flowchart of a method for detecting employing an automated function according to an exemplary embodiment of the present invention.

The method starts in the idle state 5600.

In step S601 the execution of an automated function inside a communication network is detected.

Step S602 comprises determining the type of the corresponding automated function.

The information representing the type of the automated function in step S602 is written in a predefined storage area of a record carrier before in step S604 the method returns to the idle state.

Figure 7:
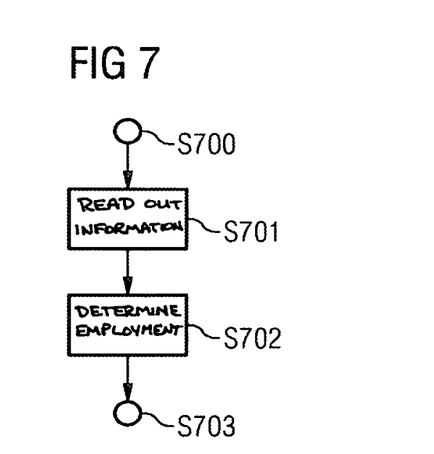
FIG. 7 shows a flowchart of a method for detecting in a Management Apparatus that an automated function has been employed in a communication network.

FIG. 7 shows a flowchart of a method for detecting in a Management Apparatus that an automated function has been employed in a communication network.

The method starts in the idle state 5700.

In step S701a request for a reason for a network configuration amendment is made by reading-out information representing the type of the automated function of a predefined storage area of a record carrier.

In another example, no request has to be made since a message containing the required information or list of parameters is received.

If a configuration NMS, i.e. an NMS responsible for configuring a network, needs to know who or which was a trigger for a detected amendment, a record carrier could be read-out. Self-X functions, in particular self optimizing self-X functions may do not use alarm messages or alarm notifications. Thus, a read-out or a request from a record carrier can be utilized to receive information about the cause of an amendment, which otherwise only would be available to the NMS 200 if an alarm message was generated.

Thus, the record carrier can be used as a "letter box" to exchange messages between an NMS 200 and a network 101, in particular to exchange the type of a self-X function employed in a network 101.

In step S702 the employment of an automated function for reconfiguring the network is determined using the information which was read-out in step S701.

In step S703 the idle state is reached again waiting for the next operation.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

ACRONYMS AND TERMINOLOGY

CM Configuration Management
MIB Management Information Base
OAM Operation, Administration, Maintenance

The invention claimed is:

1. A method comprising:
    detecting an execution of an automated function within a communication network;
    determining a type of the automated function; and
    writing information representing the type of the automated function in a predefined storage area of a record carrier,
    said method being performed by an agent apparatus to enable a network management apparatus to detect remotely on said record carrier whether the automated function has been employed within said communication network,
    wherein the automated function excludes employing a Network Management System;
    wherein the type of the automated function is at least one type of a self-X function selected from the group of types of self-X functions consisting of: Self-configuration; Self-optimization of Interference Coordination; Automatic Neighbour List Management; Self-optimization load balancing; Self-optimization Interference Coordination; Self-optimization of Random Access Channel; Self-optimization of capacity; Self-optimization of coverage; Self-Software-Management; and Self-healing; and
    wherein the predefined storage area is addressed by a sourceIndicator parameter of at least one of a method, a message, and a method and a message selected from the group of methods according to the 3GPP standard TS32.662, the group consisting of:
    a notifyObjectCreation method;
    a notifyObjectDeletion method; and
    a notifyAttributeValueChange method.

2. The method of claim 1, further comprising:
    writing in a further predefined storage area of the record carrier information, which allows specifying the automated function.

3. The method of claim 2, wherein the further predefined storage area is a further parameter of at least one of a method, a message, and a method and a message of the group of methods according to the 3GPP standard TS32.662 consisting of:
    a notifyObjectCreation method;
    a notifyObjectDeletion method; and
    a notifyAttributeValueChange method.

4. The method of claim 1, further comprising:
    communicating the information representing the type of the automated function between an Agent Apparatus and at least one of a Management Apparatus, a Self-X Server, and a Management Apparatus and a Self-X Server.

5. An apparatus comprising:
one or more processors; and
one or more memories including computer program code, the one or more memories and the computer program code configured, with the one or more processors, to cause the apparatus to perform at least the following:
detecting an execution of an automated function within a communication network;
determining the type of the automated function; and
writing information representing the type of the automated function in a predefined storage area of a record carrier of said apparatus,
said apparatus being an agent apparatus enabling a network management apparatus to detect remotely on said record carrier of said apparatus whether the automated function has been employed within said communication network,
wherein the automated function excludes employing a Network Management System;
wherein the type of the automated function is at least one type of a self-X function selected from the group of types of self-X functions consisting of: Self-configuration; Self-optimization of Interference Coordination; Automatic Neighbour List Management; Self-optimization load balancing; Self-optimization Interference Coordination; Self-optimization of Random Access Channel; Self-optimization of capacity; Self-optimization of coverage; Self-Software-Management; and Self-healing; and
wherein the predefined storage area is addressed by a sourceIndicator parameter of at least one of a method, a message, and a method and a message selected from the group of methods according to the 3GPP standard TS32.662, the group consisting of:
a notifyObjectCreation method;
a notifyObjectDeletion method; and
a notifyAttributeValueChange method.

6. The apparatus of claim 5, wherein the apparatus is contained in at least one network apparatus selected from the group of network apparatuses consisting of:
an Element Management System;
a network element;
a server;
a self-X server;
a self-healing server;
a BTS;
an RNC;
a NodeB; and
an eNodeB.

7. A method comprising:
reading out information representing a type of an automated function remotely from a predefined storage area of a record carrier of an agent apparatus; and
determining whether the automated function has been employed using the information,
said method being performed by a network management apparatus to detect remotely on said record carrier of the agent apparatus whether the automated function has been employed within said communication network,
wherein the automated function excludes employing a Network Management System;
wherein the type of the automated function is at least one type of a self-X function selected from the group of types of self-X functions consisting of: Self-configuration; Self-optimization of Interference Coordination; Automatic Neighbour List Management; Self-optimization load balancing; Self-optimization Interference Coordination; Self-optimization of Random Access Channel; Self-optimization of capacity; Self-optimization of coverage; Self-Software-Management; and Self-healing; and
wherein the predefined storage area is addressed by a sourceIndicator parameter of at least one of a method, a message, and a method and a message selected from the group of methods according to the 3GPP standard TS32.662, the group consisting of:
a notifyObjectCreation method;
a notifyObjectDeletion method; and
a notifyAttributeValueChange method.

8. An apparatus comprising:
one or more processors; and
one or more memories including computer program code, the one or more memories and the computer program code configured, with the one or more processors, to cause the apparatus to perform at least the following:
reading out information representing a type of an automated function of remotely from a predefined storage area of a record carrier of an agent apparatus; and
determining whether the automated function has been employed using the information,
said apparatus being a network management apparatus detecting remotely on said record carrier of the agent apparatus whether the automated function has been employed within said communication network,
wherein the automated function excludes employing a Network Management System;
wherein the type of the automated function is at least one type of a self-X function selected from the group of types of self-X functions consisting of: Self-configuration; Self-optimization of Interference Coordination; Automatic Neighbour List Management; Self-optimization load balancing; Self-optimization Interference Coordination; Self-optimization of Random Access Channel; Self-optimization of capacity; Self-optimization of coverage; Self-Software-Management; and Self-healing; and
wherein the predefined storage area is addressed by a sourceIndicator parameter of at least one of a method, a message, and a method and a message selected from the group of methods according to the 3GPP standard TS32.662, the group consisting of:
a notifyObjectCreation method;
a notifyObjectDeletion method; and
a notifyAttributeValueChange method.

9. A computer program product comprising a non-transitory computer-readable storage medium bearing computer program code embodied therein for use with a computer, the computer program code comprising code for performing the method of claim 1.

10. A computer program product comprising a non-transitory computer-readable storage medium bearing computer program code embodied therein for use with a computer, the computer program code comprising code for performing the method of claim 7.

* * * * *

UNITED STATES PATENT AND TRADEMARK OFFICE
CERTIFICATE OF CORRECTION

| | | |
|---|---|---|
| PATENT NO. | : 9,118,545 B2 | Page 1 of 1 |
| APPLICATION NO. | : 13/145671 | |
| DATED | : August 25, 2015 | |
| INVENTOR(S) | : Suerbaum | |

It is certified that error appears in the above-identified patent and that said Letters Patent is hereby corrected as shown below:

In the claims

Claim 8, col. 26, line 24 "of" deleted.

Signed and Sealed this
Eighth Day of December, 2015

Michelle K. Lee
*Director of the United States Patent and Trademark Office*